Sept. 7, 1965 J. B. TAYLOR, JR., ETAL 3,205,482

EMERGENCY SIGNAL RADIO RECEIVER RESPONSIVE TO CESSATION OF ALL BUT THE EMERGENCY FREQUENCY

Filed June 27, 1961 2 Sheets-Sheet 1

INVENTORS
JAMES B. TAYLOR, JR.
RICHARD A. KELTING
WILLIAM CHARLES SODERGREEN
BY
Morgan, Finnegan, Durham & Pine
ATTORNEYS

INVENTORS.
JAMES B. TAYLOR, JR.
RICHARD A. KELTING
WILLIAM CHARLES SODERGREEN

BY
Morgan, Finnegan, Durham & Pine
ATTORNEYS

United States Patent Office 3,205,482 Patented Sept. 7, 1965

3,205,482

EMERGENCY SIGNAL RADIO RECEIVER RESPONSIVE TO CESSATION OF ALL BUT THE EMERGENCY FREQUENCY

James B. Taylor, Jr., Dallas, and Richard A. Kelting and William Charles Sodergreen, Irving, Tex. (all of 2668 Roger Williams Drive, Irving, Tex.)

Filed June 27, 1961, Ser. No. 120,018
4 Claims. (Cl. 340—171)

This invention relates to a system for monitoring electromagnetic propagation and producing signaling as a function of said monitoring and more particularly to a system for monitoring selected bands of the radio wave spectrum such as certain bands of the commerical broadcast spectrum, and for generating signal functions, e.g., alert indications, in accordance with the results of said monitoring.

There have been various proposals for systems adapted to alert the public in the event of extraordinary situations such as attack by an aggressor, an atomic accident, or a natural disaster such as an earthquake.

The arrangements proposed heretofore have been of varied scope. Some involve the construction of special transmitters for propagating unique signals. Others suggest the assignment of one local transmitter in the broadcast band to a special signaling function, this key transmitter acting to transmit special signals on a particular wavelength when the public is to be alerted. As a necessary corollary to transmitter modifications these proposals also include either modifications to conventional receivers or the provision of special receivers. These receivers, however produced, include special, and generally complex, circuit designed to respond to the signaling technique. The signaling technique, in turn, may involve sub-audible or ultrasonic modulation of either the AM or FM type. Some include amplitude modulation of an otherwise conventional FM system; others suggest prearranged tone distributions or special alert carrier frequencies. Still others provide means for monitoring the AVC voltage generated by a particular station together with means responsive to a failure of this voltage for producing a special signal.

To provide a response to many of these special signaling techniques inevitably requires complex and therefore relatively unreliable and expensive circuit configurations. Many of the proposed circuits involve extensive electromagnetic switches. Others employ bimetallic elements, tuned reeds, tone responsive networks and even stepping motors.

In view of the serious nature of alert signaling and the fearsome implications of a failure, the acceptability of these various proposals may well be questioned. For example, the uncertainty which is inherent where a system depends upon operation of a special or key transmitter, or which monitors a single commercial transmitter, would seem to be a bar to reliable operation in view of the possibility of component or human failure, surprise enemy attack or even sabotage. Reliance on a special transmitter or special signaling makes frequent checking of the system, both transmitter and receiver, difficult. It also introduces a requirement in the receiver for special tuning provisions in order to insure that the receiver will be tuned to the proper wavelength. To meet this requirement, stabilized local oscillators and other elaborate measures may be needed. In addition, systems operating on these principles require sufficient special transmitters to cover virtually the entire nation and perhaps outlying territories as well. There is also the possibility that natural or man-made static may interfere with the signaling operation. Other burdens which militate against the use of known systems include the radiating character of the receiver arrangements, the susceptibility thereof to image and other heterodyne disturbances, and the employment therein of bulky, heavy and short-lived components which consume substantial amounts of power and are therefore not practically portable.

It is thus an object of the invention to provide a signaling system which does not rely on the operation of special or key transmitters nor on special signaling techniques.

A further feature of the invention is to provide a receiver for a signaling system which will provide an alarm or other signaling function without reliance on special transmission techniques and without the need for tuning to a particular wavelength.

A still further feature of the invention is to provide a signaling system having a monitor receiver which is not affected by fading, shutdown or other propagation irregularities of a station.

A still further feature of the invention relates to a signaling system employing a receiver which is non-radiating, i.e., passive, and which is operative in any region where there is a spectrum of RF energy.

A still further feature of the invention is to provide such a receiver which is completely compatible with current civilian defense proposals, which has an inherent fail-safe feature, and which may be easily tested to determine proper operation.

A still further object of the invention is to provide such a receiver which is simple, compact, light and has low power requirements, thus being realistically portable.

Another object of the invention is to provide in such a receiver, means enabling a monitoring of instructions broadcast by Conelrad techniques.

It is also an object to provide in such a receiver, components which have a theoretically infinite operating life and which may be actuated without reliance on municipal or public utility power sources.

These and other objects and advantages of the invention will be set forth in part hereinafter, and in part will be obvious herefrom or may be learned by practice of the invention, the same being realized and attained by means of the instrumentalities and combinations particularly pointed out in the appended claims.

The invention is based on the assumption, totally consistent with present civilian defense procedures, that a significant number of conventional broadcast stations will cease transmission in the event of an alert. Stringent measures have been adopted to insure this cessation to avoid giving the enemy homing opportunities. The attainment of this condition, at least with respect to a significant number, as distinguished from all the stations, is thus deemed realistic and most probable of all the various alerting steps proposed. The greater probability of its attainment is also evident when one compares the negative act of cessation with an alternative affirmative act such as activation and control of special transmitters. The latter is more susceptible to human error and sabotage, is plagued with the possibility of component failure, external interference, static, jamming and the like, while the cessation technique is not. Moreover, a surprise attack may interrupt all communication in which event a signaling system based on cessation will function to warn those not already overwhelmed while a system relying on positive communication will fail.

The invention therefore comprises means for monitoring a band of wavelengths encompassing a plurality of conventionally operated stations. To effect this monitoring function in an exemplary arrangement, the invention comprises a receiver, tuned broadly over a band of frequencies in the electromagnetic spectrum, such as a segment of the broadcast band together with indicating means for providing a signaling function in the event said spectrum changes substantially.

The invention consists in the novel parts, constructions, arrangements, combinations and improvements herein shown and described.

Serving to illustrate embodiments of the invention are the drawings, of which:

As embodied, the receiver according to the invention includes broadly tuned pick-up means comprising in one form an antenna A of the ferrite loop stick type. The antenna output is fed to amplifying means and as embodied, is thus coupled via capacitor C1 to the base of a transistor Q1 connected in common-emitter configuration. The transistor accordingly amplifies the electromagnetic energy lying in a certain band, for example the commercial broadcast band between 550 kc. and 1650 kc. or a segment thereof.

Biasing for transistor Q1 is achieved by means including a divider R1, R2 connected at its median to the base of Q1 and further connected across the terminals B1 and B2 of a source of power B. Additionally, a resistor R3 connects the collector of transistor Q1 to power terminal B1, while a parallel combination of resistance R4 and capacitance C2 is connected between the emitter and terminal B2.

Connected between the collector of Q1 and terminal B2 are filter means comprising a tuned circuit in the form of serially connected inductor L1 and capacitance C3. The function of this circuit is to decouple or reject signals of a certain wavelength, e.g., Conelrad signals, which may continue to be transmitted after an alert has been sounded.

The output of amplifier Q1, thus filtered, is coupled via capacitor C4 to the base of a further amplifier comprising a transistor Q2 also in the common-emitter mode. For biasing, a divider R5, R6 is connected at its median to the base of Q2 and at its ends to power terminals B1 and B2; the emitter is connected to terminal B2 via the parallel combination of resistor R8 and capacitor C5; connection of the collector of Q2 is made to power terminal B1 by way of a resistor R7.

The output of amplifier Q2 is subjected to further filtering provided by a tuned circuit including inductance L2 and capacitance C6 serially connected between the collector of Q2 and power terminal B2. Thus signals on other Conelrad wavelengths, or other signals not likely with any reasonable certainty to be suppressed during an alert, may also be filtered out.

The output of Q2 is also subjected to a detection action provided by means including diode D1, energized via coupling capacitor C7. The resultant detected signal is then applied between the base and emitter of transistor amplifier Q3, also in common-emitter configuration, and in the normal mode saturates the same. In the collector or output circuit of Q3 are switching means comprising in one form a relay K1 which is connected between the collector and power terminal B1. Relay K1 has a set of contacts which illustratively comprise a single pole double throw arrangement having one contact in connection with power terminal B2 and another contact connected to signal means S. The signaling circuit is also connected to power terminal B1 and may comprise an alarm lamp, bell, buzzer or the like. The signaling means may also comprise a door bell circuit, telephone system, or light circuit and the like.

Figure 1:
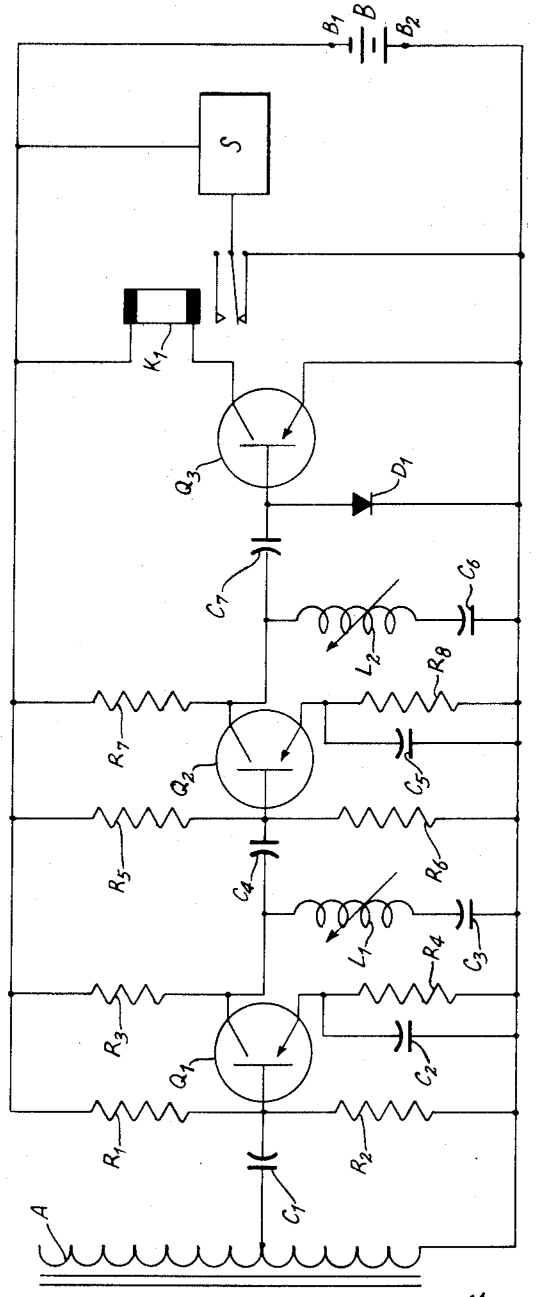
FIGURE 1 is a schematic diagram of a passive monitoring receiver constructed according to the invention.
Figure 2:
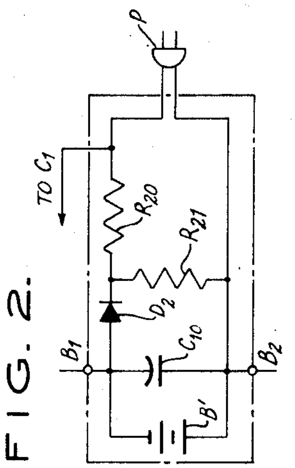
FIGURE 2 is a schematic diagram illustrating a power supply arrangement for the receiver of FIGURE 1.

For supplying power to the receiver of FIGURE 1, an arrangement is provided which may be substantially independent of the availability of commercial power such as that provided by the utility companies. Thus, the power source B of FIGURE 1 may comprise a long life battery, for example, one of the mercury or silver types. Alternatively, and as shown in FIGURE 2, the power source may comprise a battery B′ such as a wet cell which may receive a continuous trickle type charge from the mains via a suitable rectifier circuit. Thus, as illustrated in FIGURE 2, connection is made via plug P to the mains outlet thus providing a voltage across a divider R20, R21. The voltage across R21 is rectified by diode D2 and may be filtered by means such as capacitor C10. Should the mains voltage collapse, battery B′ is nevertheless in charged condition and is therefore able to supply the power necessary for monitoring with its receiving, detecting and signaling functions. If connections are to be made to the mains such as suggested by the arrangement of FIGURE 2, then the power line may also be employed as an antenna in which event a connection would be made from one side of the power line to the antenna side of capacitor C1. With this arrangement the ferrite antenna A may be eliminated.

Figure 3:
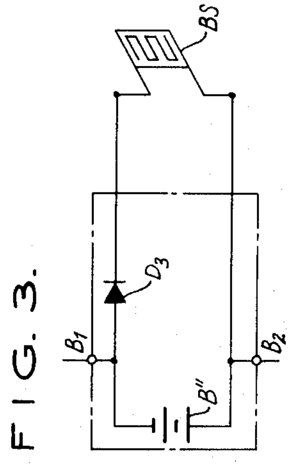
FIGURE 3 is a schematic diagram illustrating an alternate or supplemental power supply for the receiver of FIGURE 1.

A further feature relating to the power supply for the receiver is schematically illustrated in FIGURE 3 wherein a battery B″ is connected via a diode D3 to a solar cell BS. The latter may serve either as the power source per se or may be employed to charge battery B″ where the latter is of the chargeable type. The arrangement of FIGURE 3 may also be used in combination with the arrangement of FIGURE 2 so that three sources of power are available, solar, commercial and battery.

The receiver according to the invention is based on the assumption that a certain number of transmitters regularly operating on various wavelengths of some band, say a part or all of the broadcast band, will cease transmission when a disaster occurs or when any enemy attack is imminent. In such an event, the signals received by the receiver of FIGURE 1 will be significantly reduced in amplitude. When this occurs, the level of base current in transistor Q3 will decrease thus causing a decrease in collector current of sufficient magnitude to cause deactivation of relay K1. The actively open (lower) contacts of the latter thus close whereby signaling circuit S is connected across the power source B and is therefore actuated.

The persistent transmission of signals on certain wavelengths during the alert condition does not abort the signaling functions as these are filtered or rejected by the tuned circuits L1, C3 and L2, C6. Filtering also may be accomplished by design of the antenna and input system such that the receiver responds to a band of energy lying outside one or more particular wavelengths.

To immunize the receiver from the effects of ambient noise and other background effects and to make it respond to a significant change in energy level rather than an absolute change, the threshold sensitivity thereof is adjusted by circuit design so that signaling will occur notwithstanding the existence of some residual input. In addition or alternatively, sensitivity of switching means may be adjusted to nullify residual inputs.

Since the receiver contains no oscillators and other radiators, i.e., is passive, the probability of an abort in the alert signaling operation is minimized. Problems associated with heterodyning are also eliminated. Since the receiver responds to a general drop in RF level over a band of frequencies, jamming is rendered impracticable.

Figure 4:
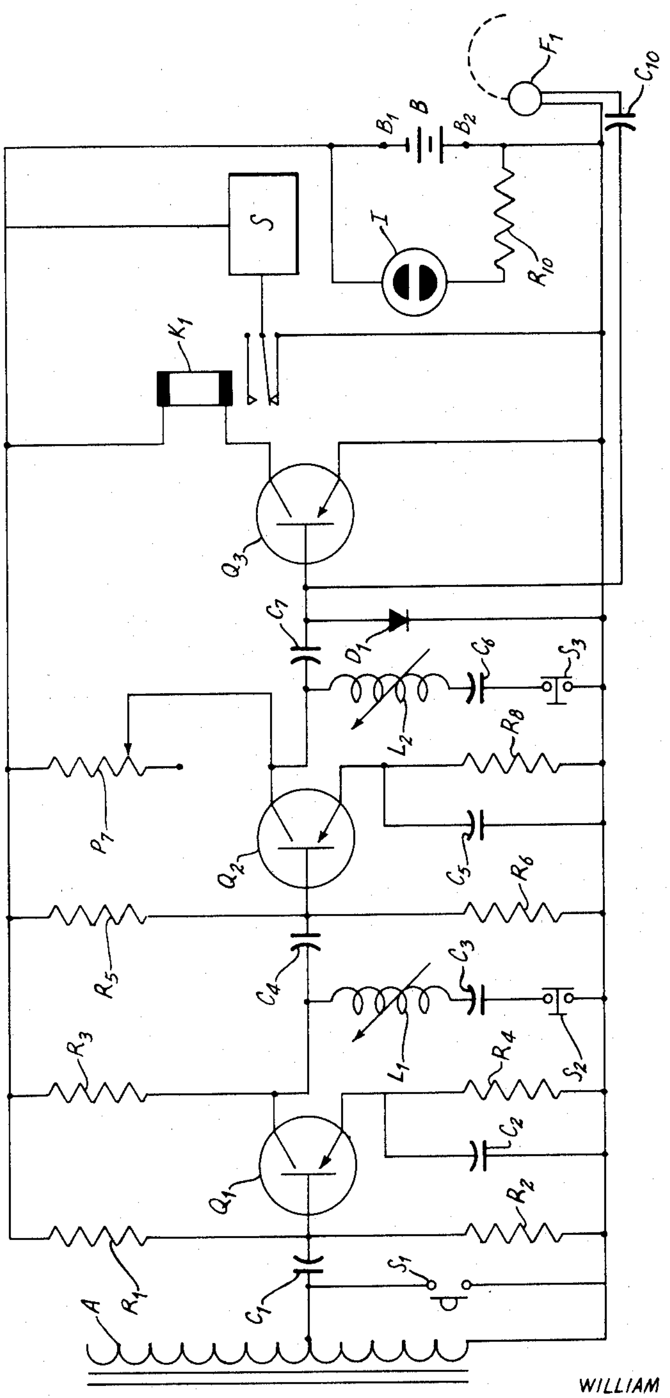
FIGURE 4 is a schematic diagram illustrating the receiver of the invention with additional features embodied therein.

Additional features may be incorporated in the receiver of the invention as illustrated in FIGURE 4. The basic circuit illustrated therein is similar to the arrangement of FIGURE 1. Modifications include testing means for checking receiver operation and as embodied, comprise a normally-open switch $S_1$ connected between the tap on antenna A and power return terminal $B_2$. Switch $S_1$ is of the momentary type and when depressed, the antenna circuit is effectively shorted thus removing the RF input to the receiver. This action essentially simulates the reduction in RF energy which would follow an alert condition. With the switch momentarily closed, relay $K_1$ in output stage Q3 will deenergize thus connecting power to the signaling circuit S. If the receiver is functioning properly, the alarm or other indication will then occur. If no alarm results then the receiver is malfunctioning. It should also be noted that the receiver of FIGURES 1 and 4 has an inherent fail-safe feature. A receiver component failure (other than one which short-circuits the B supply), causes the alarm to sound.

An additional feature may be incorporated in the receiver of the invention to permit monitoring of instructions broadcast on special frequencies, e.g., on the Conelrad wavelengths. As embodied, these means comprise a normally closed momentary switch S2 and/or S3 connected respectively between the reject filters L1, C3 or L2, C6 and the return circuit. The monitoring means further include a sound reproducer such as earphones F1 which may be conveniently plugged into the receiver when monitoring is desired. The earphones are connected via a capacitor C10 between the base of transistor Q3 and return terminal B2. If filter L1, C3 is tuned to one of the Conelrad frequencies, then actuation of switch S2 connected to this filter opens the circuit thereof and thus permits reception of Conelrad messages via the receiver and earphones F1 where instructions may be heard.

In similar fashion, S3 may be actuated to monitor transmissions at frequencies to which filter L2, C6, is tuned.

By way of illustrating suitable means for providing threshold control, reference may be had to stage Q2 of FIGURE 4 where potentiometer P7 is employed. This potentiometer is connected between the follower of transistor Q2 and power terminal B1. Adjustment of P7 adjusts the threshold sensitivity of the receiver.

For checking the power supply B, monitoring means may be provided such as neon lamp indicator I which is connected across the power source via a resistor R10. Alternatively a neon lamp or other suitable indicator may be connected between the power source and a pair of terminals on relay K1 which close when the relay is energized. This latter arrangement serves as a check on both the power supply and the receiver.

As an alternate to electromechanical switching means, the receiver of the invention can effectively actuate nonmechanical switching means such as a solid state switch. Thus, a Zener diode may be connected between the emitter and collector of output stage Q3. The diode will break down should the emitter-collector voltage rise a predetermined amount thus providing switching for signaling functions.

In studying and practicing the invention other modifications will occur to those skilled in the art. Thus, the invention in its broader aspects is not limited to the specific mechanisms shown and described but departures may be made therefrom within the scope of the accompanying claims without departing from the principles of the invention and without sacrificing its chief advantages.

What is claimed is:

1. Alert signal apparatus comprising: receiving means broadly tuned to respond simultaneously to signals on a plurality of wavelengths in a preselected band, said receiving means including means for rejecting signals of a preselected wavelength in said preselected band; and signaling means responsive to the output of said receiving means providing a signal when the output of said receiving means drops due to the cessation of said signals on a plurality of wavelengths in said preselected band other than said signals of preselected wavelength.

2. The apparatus of claim 1 in which said receiving means comprises amplifying means and detecting means, and wherein said signaling means includes switching means normally energized in response to the output of said detecting means, said switching means causing operation of said signaling means when the output of said detecting means drops due to the cessation of said signals on a plurality of wavelengths in said preselected band other than said preselected wavelength.

3. The alert signal apparatus of claim 1, wherein said receiving means includes means for rejecting signals of another preselected wavelength in said preselected band and said signaling means responsive to the output of said receiving means provides a signal when the output of said receiving means drops due to the cessation of said signals on a plurality of wavelengths in said preselected band other than said signals of said preselected wavelength and said another preselected wavelength.

4. The apparatus of claim 3 wherein said receiving means comprises amplifying means and detecting means and wherein said signaling means includes switching means normally energized in response to the output of said detecting means, said switching means causing operation of said signaling means when the output of said detecting means drops due to the cessation of said signals on a plurality of wavelengths in said preselected band other than said preselected wavelength and said another preselected wavelength.

References Cited by the Examiner

UNITED STATES PATENTS

| | | | |
|---|---|---|---|
| 2,346,889 | 4/44 | Wullschleger | 343—225 |
| 2,437,876 | 3/48 | Cohn | 325—464 |
| 2,879,383 | 3/49 | Powell | 325—466 |
| 2,993,991 | 7/61 | Lundahl | 325—466 |

OTHER REFERENCES

QST, June 1956, pp. 17–19 and 140, "Conelrad Alarm Circuits."

QST, January 1957, pp. 49 and 134, "Hints for the Experimenter."

Radio and TV News, April 1957, p. 66, "Conelrad the Easy Way," John T. Frye.

The Cornell-Dublier Capacitor, "Conelrad Circuits," vol. 23, No. 3, March 1958, pp. 3–9.

Electronics, May 23, 1958, pp. 74–77, "Alarm System Uses Gated Neon Warbler," R. L. Ives.

NEIL C. READ, *Primary Examiner.*

IRVING SRAGOW, *Examiner.*